VARIABLE IMPEDANCE ELECTRICAL CIRCUITS

Filed May 13, 1963 2 Sheets-Sheet 1

FREDERICK A. WILSON,
INVENTOR

BY Hall & Houghton

ATTORNEY

FREDERICK A. WILSON,
INVENTOR,

BY Hall & Houghton

ATTORNEY 3,270,142

VARIABLE IMPEDANCE ELECTRICAL CIRCUITS

Frederick Arthur Wilson, Colindale, London, England, assignor to Her Majesty's Postmaster General, London, England Filed May 13, 1963, Ser. No. 279,966
Claims priority, application Great Britain, May 14, 1962, 18,523/62
12 Claims. (Cl. 179—81)

This invention relates to electrical circuits including an impedance which is variable in dependence with the level of A.C. signal inputs to the circuit.

According to the invention, an electrical circuit has output terminals the impedance between which is controllable by the collector current of a transistor having a base-emitter circuit arranged for half-wave rectification of A.C. input signals.

A circuit constructed in accordance with the invention may be used in conjunction with a telephone instrument having a telephone receiver and a telephone microphone (transmitter), for example a telephone operator's head set or a telephone hand set, in order to reduce sidetone levels and to regulate receiving levels. The circuit has input terminals connected across the telephone transmitter for supplying A.C. input terminals to the base-emitter circuit of the transistor. The circuit has a pair of output terminals connected across the telephone receiver and bridged by an impedance network whose impedance is controllable by the collector current of the transistor in such manner that the network impedance decreases with increasing collector current. Such an arrangement tends to decrease the telephone receiver sensitivity and in certain telephone instruments this may be desirable. The circuit is arranged to have a high input impedance so that it does not appreciably shunt the telephone transmitter.

The impedance between the circuit output terminals may include at least one unilateral conductive device and in a preferred arrangement is a network including a pair of diode rectifiers and a pair of capacitors, connected to provide two parallel impedance paths between the output terminals of the circuit; each path consists of a diode in series with a capacitor and the collector of the transistor is so connected to the junction of the capacitor and diode in one path that collector current flows through both diodes in a forward direction.

A.C. input signals may be applied to the base-emitter circuit of the transistor either directly or by an amplifier stage which may itself comprise a transistor. Conveniently both transistors may be arranged in common-emitter configuration.

By way of example, the invention will be described in greater detail with reference to the accompanying drawings, of which:

Figure 1:
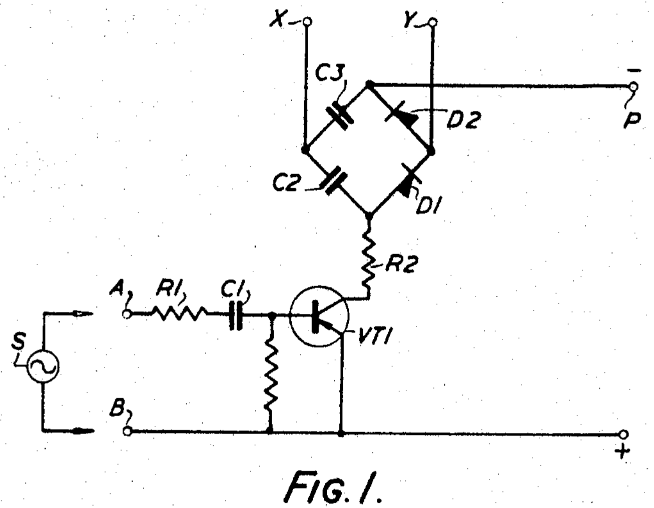
FIG. 1 is a basic circuit of an embodiment of the invention.

In FIG. 1, a p-n-p transistor VT1 is connected in common-emitter configuration and biased to operate as a half-wave rectifier. The circuit has input terminals A and B connected across the base-emitter path of the transistor VT1, terminal A being connected to the base of the transistor by a series connected resistor R1 and capacitor C1.

In the collector circuit of the transistor VT1, a pair of unilateral conductive devices, shown as diode rectifiers D1 and D2, together with a pair of capacitors C2 and C3 are connected to provide two parallel impedance paths, formed by D1, C2 and D2, C3, between circuit output terminals X and Y. The diodes D1 and D2 are oppositely poled and their junction is connected to the terminal Y. The collector electrode of the transistor VT1 is connected to the junction of the diode D1 and the capacitor C2 by a resistor R2 and the junction of the capacitor C3 and the diode D2 is connected to a negative supply terminal P.

In use of the circuit, an A.C. signal input source S is connected across the terminals A and B, it being arranged that the circuit input impedance is sufficiently high to introduce only a negligible shunt loss across the source S. The A.C. input signals are rectified by the base-emitter circuit of the transistor VT1 and the resultant unidirectional collector current flows through both of the diodes D1 and D2 in a forward direction. Increases in the A.C. signal input amplitude, which increase the collector current, and the effective impedance of the network cause decrease of the effective D1, D2, C2, C3.

The circuit of FIG. 2 includes a transistor VT1 and associated circuitry similar to that described with reference to FIG. 1. However, in FIG. 2, the input terminals A and B are connected to the base-emitter path of the transistor VT1 via an amplifying stage.

The amplifying stage includes a p-n-p transistor VT2 connected in common-emitter configuration and having biasing arrangements including resistors R3, R4, R5, R6 and C4. The transistor VT2 has a collector load resistor R7 and is coupled to the base of the transistor VT1 by a capacitor C5.

The transistor VT2 amplifies A.C. input signals and increases the range of effectiveness of the variable loss circuit D1, D2, C2, C3 associated with the transistor VT1.

In use of a telephone operator's head set or a telephone hand set, the sidetone and receiving levels may be inconveniently high and various proposals have been made to overcome these difficulties. The circuits described above are suitable for this use as will be described below.

Figures 3, 4:
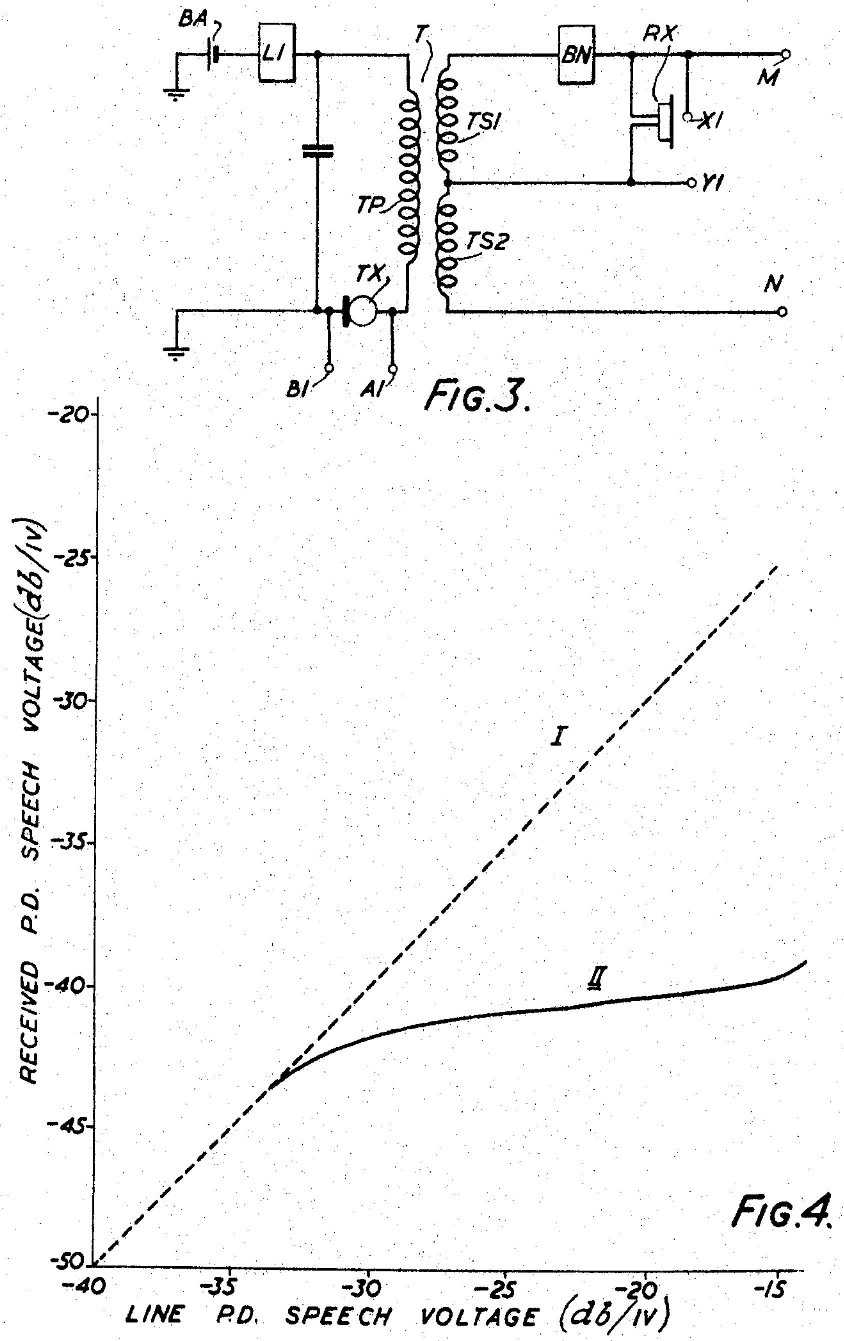
FIG. 3 is the electrical circuit of a telephone instrument.
FIG. 4 is a graph showing receiving characteristics of a telephone operator's head set.

FIG. 3 is an electrical circuit of a telephone operator's head set including a telephone transmitter (microphone) TX and a telephone receiver RX. A battery BA supplies a D.C. current to the transmitter TX via a retard coil L1 and the primary winding TP of a hybrid transformer T. Terminals MN, for connection to a telephone line, are connected to secondary windings TS1 and TS2 of the hybrid transformer. The receiver RX is connected across the winding TS1 via a balance network BN. Terminals A1, B1 are connected across the transmitter TX and terminals X1, Y1 across the receiver RX.

Figure 2:
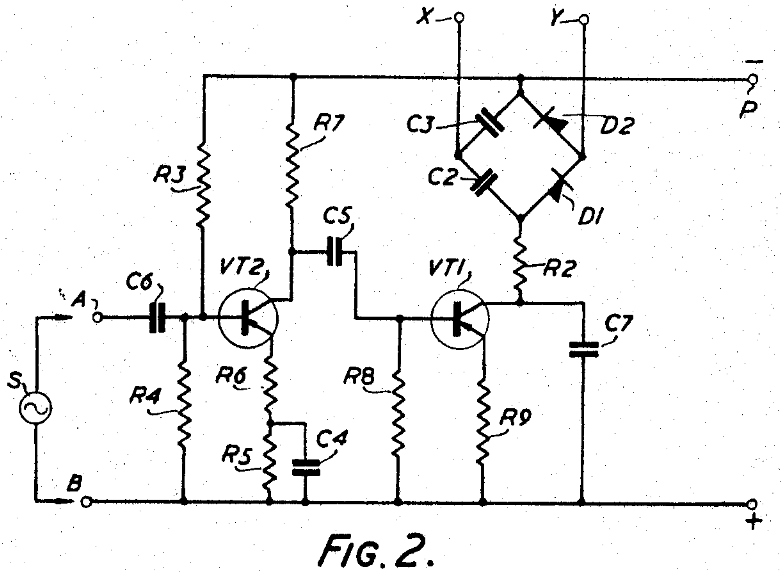
FIG. 2 is the circuit of a further embodiment of the invention.

Either of the circuits of FIGS. 1 and 2 may be connected to the head set circuit shown in FIG. 3 by connection of terminals A, B to the terminals A1, B1 and of terminals XY to terminals X1, Y1. When the transmitter TX is being spoken into, the circuit D1, D2, C2, C3 provides a shunt loss across the receiver RX, the loss increasing with increasing magnitude of transmitter current. Thus, the shunt impedance across the receiver RX will depend on the volume of speech into the transmitter. Also, an incoming signal dissipates power in the transmitter TX thereby setting up a signal voltage between terminals A1 and B1 which causes the diodes D1 and D2 to shunt the receiver RX to a degree dependent on the incoming signal level. Thus the circuits shown in FIGS. 1 and 2 serve to reduce sidetone level and also to regulate receiving level.

The diode bridge circuit connected across the output terminals XY in FIGS. 1 and 2 includes two oppositely poled diodes and this arrangement is preferred to the use of a single diode, when the circuits are used in conjunction with a telephone set, since distortion is lower, click-suppression of either polarity is provided and the maximum A.C. shunt loss for a given D.C. collector current is greater. The diode bridge circuit includes two capacitors which provide an A.C. tapping point across the diodes.

FIG. 4 shows receiving characteristics of a telephone operator's head set, having a circuit as shown in FIG. 3, the curve I showing the characteristics of the head set alone and the curve II showing the characteristic when the FIG. 3 circuit is connected to the circuit of FIG. 2, in the manner previously described, and having the following component values:

| | | |
|---|---|---|
| R2 | ohms | 1.1K |
| R3 | do | 68K |
| R4, R8 | do | 10K |
| R5 | do | 1K |
| R6 | do | 39 |
| R7 | do | 3.9K |
| R9 | do | 100 |
| C2, C3, C4 | µf | 100 |
| C5 | µf | 8 |
| C6 | µf | 4 |
| C7 | µf | 50 |
| VT1 | | OC 202 |
| VT2 | | CV 7005 |
| D1, D2 | | CV 7048 |

The circuits shown in FIG. 1 and FIG. 2 may be used for sidetone level regulation in conjunction with telephone operators' head sets (as described above) for example with a head set as described and shown in Post Office Electrical Engineers Journal, vol. 53, part 3, pages 177–180 and also in conjunction with telephone hand sets, e.g. a hand set as described and shown in Post Office Electrical Engineers Journal, vol. 52, part 1, page 1.

I claim:

1. An electrical circuit including a transistor having a base-emitter circuit arranged for operation as a half-wave rectifier, a pair of input terminals connected to the base-emitter circuit for the supply of A.C. input signals thereto, a pair of output terminals, a current controllable impedance network bridging the output terminals, means connecting the collector of the transistor to the impedance network to supply collector current thereto for controlling the impedance of the said network.

2. The combination of claim 1, in which the said network is adapted to have its impedance decreased by increasing control current.

3. The combination of claim 2, in which the said network includes at least one unilateral conductive device.

4. The combination of claim 1, in which the said transistor is arranged in common-emitter configuration.

5. An electrical circuit including a transistor arranged in common-emitter configuration and having its base-emitter circuit arranged for operation as a half-wave rectifier, a pair of input terminals connected to the base-emitter circuit for supply of A.C. input signals thereto, a pair of output terminals, a current controllable impedance network bridging the output terminals, and means connecting the collector of the transistor to the said network to supply collector current thereto whereby the impedance of the impedance network decreases with increase in collector current.

6. The combination of claim 5, in which the said impedance network includes at least one unilateral conductive device.

7. The combination of claim 5, in which the said impedance network comprises two parallel impedance paths bridging the output terminals, each said path comprising a series connected capacitor and unilateral conductive device, and means connecting the collector of the said transistor to the junction of the capacitor and unilateral conductive device in one of the said paths for supplying collector current in a forwards direction through both the said unilateral conductive devices.

8. The combination of claim 5, in which the said input terminals are connected to the base-emitter circuit of the said transistor by a common-emitter transistor amplifier stage.

9. An electrical circuit including a transistor arranged in common-emitter configuration and having its base-emitter circuit arranged for operation as a half-wave rectifier, a pair of input terminals connected by a common-emitter transistor amplifier stage to the said base-emitter circuit for supplying A.C. input signals thereto, a pair of output terminals, two parallel impedance paths bridging said output terminals, each of the said impedance paths comprising a series connected capacitor and unilateral conductive device, means connecting the collector of the said transistor to the junction of the capacitor and unilateral conductive device in one of said impedance paths to supply collector current in a forwards direction through both of the said unilateral conductive devices.

10. A telephone instrument including microphone means and receiver means, a variable impedance electrical circuit including a transistor arranged in common-emitter configuration and having its base-emitter circuit arranged for operation as a half-wave rectifier, means connecting the said base-emitter circuit in parallel with the said microphone means, a current controllable variable impedance network, means connecting the said network in parallel with the said receiver means, and means connecting the collector of the said transistor to the impedance network for supplying collector current thereto to decrease the impedance of the network with increase in collector current.

11. The combination of claim 10, in which the variable impedance network comprises two impedance paths each connected in parallel with the said receiver means, each of the said impedance paths comprising a capacitor connected in series with a unilateral conductive device, means connecting the collector of the said transistor to the junction of the capacitor and the unilateral conductive device in one of the said impedance paths for supplying collector current in a forwards direction through both of the said devices.

12. The combination of claim 10, in which the said means connecting the base-emitter circuit of the said transistor in parallel with the said microphone means comprises a common-emitter transistor amplifier stage.

No references cited.

KATHLEEN H. CLAFFY, *Primary Examiner.*

H. ZELLER, *Assistant Examiner.*